3,503,935
AQUEOUS-SOLUBLE POLYURETHANES
Heinz Ziemann, Leichlingen, and Wolfgang Lehmann, Leverkusen, Germany, assignors to Farbenfabriken Bayer Aktiengesellschaft, Leverkusen, Germany, a corporation of Germany
No Drawing. Filed July 22, 1966, Ser. No. 567,068
Claims priority, application Germany, July 30, 1965, F 46,754
Int. Cl. C08g 22/04, 41/00
U.S. Cl. 260—77.5    11 Claims

ABSTRACT OF THE DISCLOSURE

Aqueous-soluble polyurethanes are prepared by reacting a water-soluble chloroformic acid ester having at least two functional groups with an aqueous solution of a polyfunctional amine, the pH of the solution being at least 6.

---

This invention relates to polyurethanes, particularly to aqueous-soluble polyurethanes and to a method for preparing the same.

Heretofore, it was known that linear polyurethanes could be prepared by the polycondensation of primary or secondary diamines with bis-chloroformic acid esters. In this process the undiluted bis-chloroformic acid esters were reacted with an aqueous diamine solution in the presence of agents which bind hydrochloric acid. In the conventional so-called interfacial polycondensation process, the bis-chloroformic acid esters have been dissolved in organic solvents which were immiscible with water and then reacted with aqueous polyamine solutions in the presence of hydrochloric acid binding agents. However, the polyurethanes thus obtained from the polycondensation processes were insoluble in water. In addition, where bis-chloroformic acid esters were reacted with tri- or higher functional amines dissolved in water, only cross-linked, insoluble polyurethanes were formed.

Furthermore, it was known that aqueous emulsions or dispersions could be prepared in the presence of emulsifiers or other additives. However, sedimentation and coagulation greatly reduced the storage stability of such dispersions.

It is therefore an object of this invention to provide aqueous-soluble polyurethanes. Another object of this invention is to provide a method for preparing aqueous-soluble polyurethanes. Still another object of this invention is to provide a method for liquefying polyurethanes without the necessity of employing an excessive amount of heat or a catalyst. A further object of this invention is to provide a method for preparing liquid products suitable for use in the preparation of plastics and coatings.

The foregoing objects and others which will become apparent from the following description are accomplished in accordance with this invention, generally speaking, by providing a method for preparing aqueous-soluble polyurethanes by reacting aqueous-soluble, polyfunctional chloroformic acid esters with polyvalent amines dissolved in water. Thus this invention provides for the formation of high molecular weight water-soluble polyurethanes by the mere polycondensation of water-soluble bifunctional or higher functional chloroformic acid esters with water solutions of di- or higher valent amines.

The mere fact that water-soluble polyurethanes could be prepared by this process is extremely surprising, since the water-soluble chloroformic acid esters are extremely sensitive to hydrolysis, especially when they are reacted in a homogeneous, aqueous phase. In addition, it is to be expected that chain cleavage would occur, especially in the presence of diamines which would in turn result in the formation of only low molecular weight polyurethanes. Furthermore, cross-linking would be expected to occur, which would result in the formation of insoluble products from the reaction of tri- or higher functional components.

Chloroformic acid esters suitable for the process of the invention include chloroformic acid esters of hydroxy alkylation products of the general formula

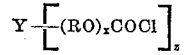

in which R is a member of the class of alkylene radicals having from 2 to 4 carbon atoms, such as ethylene, propylene, butylene or mixtures thereof, Y denotes oxygen, sulphur or substituted or unsubstituted divalent radicals capable of undergoing hydroxyalkylation, $x$ represents a number of at least 2 and $z$ represents a whole number of at least 2. It is preferred that R be an ethylene radical or mixtures of ethylene and propylene or butylene radicals. However, only that amount of propylene or butylene radicals should be employed which will not materially affect the solubility of the resulting polyurethane. Suitable compounds capable of undergoing hydroxyalkylation, preferably hydroxyethylation, are any compounds having at least two mobile hydrogen atoms which will add to the alkylene oxide (see Houben-Weyl, Methods of Organic Chemistry, vol. VI/3, p. 447 et seq. and vol. XIV/2, p. 436 et seq.). The more hydrophobic the radical Y, the greater the increase in the hydrophilic nature of $x$ in order to achieve water-solubility of the chloroformic acid ester.

The chloroformic acid esters of this invention may be prepared in a known manner, such as by the reaction of polyols with phosgene. Especially suitable for this process are the chloroformic acid esters of polyethylene oxides, hydroxyethylation products of trimethylolpropane, glycerol or hexanetriols.

Suitable amines for reacting with the chloroformic acid esters in the formation of aqueous-soluble polyurethanes may be represented by the following general formula

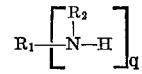

wherein $R_1$ represents an organic radical selected from the group consisting of aliphatic, cycloaliphatic, araliphatic, aromatic or heterocyclic radicals, $R_2$ represents hydrogen, alkyl, hydroxyalkyl, cyanoalkyl or carbamidoalkyl radicals such as, for example, methyl, ethyl, butyl, hydroxyethyl, hydroxybutyl, cyanoethyl, cyanobutyl, carbamidoethyl and carbamidobutyl radicals and $q$ is an integer of at least 2. In other words, the polyvalent amine may be substituted or unsubstituted and contain at least two amino groups capable of reacting with chloroformic acid esters. Especially suitable are compounds having the general formula

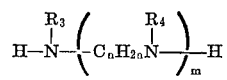

wherein $R_3$ and $R_4$ which may be the same or different are the same as $R_2$, $n$ is an integer of at least 2 and $m$ is an integer of at least 1.

The following represent suitable amines which may be employed in this invention such as, for example, ethylene diamine, N,N'-dimethyl-ethylenediamine, N-(2-hydroxyethyl) - ethylenediamine, N-(2-cyanoethyl)-ethylenediamine, N - (2-carbamidoethyl)-ethylenediamine, propylenediamine, tetramethylenediamine, hexamethylendiamine, diethylenetriamine, triethylenetetramine, tetraethylenepentamine, pentaethylenehexamine, dipropylenetriamine, bis-(γ-aminopropyl)-methylamine, dipropylene-(1,2)-triamine and tripropylene-(1,2)-tetramine.

Polyvalent amines which are suitable for the process of the invention include, for example, compounds having the following formula

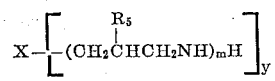

in which X denotes oxygen, sulphur or at least a divalent radical of an aliphatic, cycloaliphatic, araliphatic, aromatic or heterocyclic hydroxy- and/or sulphhydryl compound, $R_5$ represents either hydrogen or a lower alkyl group, $m$ represents an integer of at least 1 and $y$ an integer of at least 2.

The following are representative examples of polyvalent amines:

bis-(3-aminopropyl)-ether,
bis-(3-aminopropyl)-sulphide,
1,2-bis-(3-aminopropoxy)-ethane,
1,4-bis-(3-aminopropoxy)-butane,
1,2-bis-(3-aminopropylthio)-ethane,
bis-(3-aminopropoxy)-neopentane,
tris-(3-aminopropoxy)-neopentane,
1,2,3-tris-(3-aminopropoxy)-propane, and
1,4-bis-(3-aminopropoxy)-benzene.

The following are also examples of suitable polyvalent amines:

piperazine,
N-aminoethyl-piperazine,
N,N'-bis-(aminoethyl)-piperazine,
N-(3-aminopropyl)-piperazine,
N,N'-bis-(3-aminopropyl)-piperazine,
N-(3-aminopropyl)-piperazine,
N,N'-bis-(3-aminopropyl)-piperazine, and
N,N'-bis-(3-aminopropyl)-hexamethylenediamine.

Examples of suitable aromatic polyvalent amines are:

3,4-diamino-benzoic acid,
2,4-diaminobenzene-sulphonic acid,
2,5-diaminobenzene-sulphonic acid,
4,6-diamino-benzene-disulphonic acid-(1,3),
naphthylenediamine-(1,2)-sulphonic acid-(4), and
4,4-diamino-3-methyldiphenylamine-sulphonic acid-(2').

In accordance with this invention, the water-soluble polyurethanes may, for example, be prepared by reacting aqueous solutions of polyvalent amines with water-soluble di- or higher functional chloroformic acid esters at temperatures of from about 0° C. to 50° C., preferably from about 0 to about 15° C., and if desired, in the presence of hydrochloric acid binding agents. Preferably, the chloroformic acid esters or solutions thereof are gradually added to the polyamine solutions in the reaction vessel. The hydrochloric acid binding agents which bind hydrochloric acid can be added at the same time or after the hydrogen ion concentration has risen to a pH=7. Where chloroformic acid ester solutions are used, the esters are dissolved in organic solvents which are miscible with water. To insure a smooth polycondensation process, especially in systems in which there is a possibility of cross-linking, it is in many cases desirable to work in relatively dilute solutions and to insure instantaneous thorough mixing by efficient agitation when the reactants are brought together. The quantity of water used for dissolving the polyvalent amines and the quantity of organic solvents miscible with water which may be used for dissolving or diluting the chloroformic acid esters are preferably so calculated that when the polycondensation reaction is terminated, the polyurethane solutions obtained have a concentration of from about 5 to about 25 percent, preferably, from about 10 to about 15 percent. These solutions may be subsequently concentrated by conventional techniques, such as by evaporation.

For the preparation of aqueous-soluble polyurethanes from bis-chloroformic acid esters and di- or higher valent amines, the reactants are preferably used in approximately equimolar quantities.

However, for the production of highly viscous solutions of basic polyurethanes, tri-or higher functional amines may also be reacted with bis-chloroformic acid esters in excess, but not in such excess that yellowing occurs. To prevent cross-linking, it is advisable, in the production of basic polyurethanes from tri- or higher functional chloroformic acid esters and polyvalent amines, to choose a molar ratio of about $1:(z-1)$ where $z$ indicates the functionality of the chloroformic acid ester. The optimum proportion of reactants necessary for achieving a desired viscosity in a reaction solution can easily be determined in each particular case by preliminary experiments.

Examples of suitable agents for binding hydrochloric acid are alkali metal hydroxides, -carbonates, -hydrogen carbonates or tertiary organic bases. Where necessary, these are added in at least equimolar quantities based on the amine solution or preferably are added during the polycondensation preferably in such a manner that the pH of the reaction solution does not fall below 6. If the molar ratio of ClCO—O— groups to basic amino groups in the reaction mixture is less than 1, these amino groups may themselves act as acid acceptors, and the hydrochloric acid binding agents may be used in correspondingly smaller quantities or may be dispensed with altogether.

Suitable solvents or diluents for the chloroformic acid esters which are to be reacted with aqueous solutions of polyvalent amines include any solvents that are inert to this class of compounds. It is preferable to use organic solvents that are miscible with water, e.g. acetone, tetrahydrofuran, dioxane, glycol monomethylether acetate, diethylene glycol-dimethylether or acetonitrile. Suitable easily volatile solvents can be removed by distillation when the polycondensation reaction is terminated.

With a suitable choice of reactants, it is possible by the instant process to obtain anion-active, neutral or cation-active polyurethanes which are soluble in an aqueous medium over a wide pH range. The polyurethane solutions may therefore contain acid groups such as carboxylic and sulphonic acid groups or basic amino groups both in the free form and in the form of salts.

Insofar as the polyurethanes prepared according to the invention from diamines are neutral, their solubility in water is due solely to the specific properties of the hydrophilic polyethylene ether segments. In other words, it is therefore necessary, depending on the diamino component, to use water-soluble chloroformic acid esters which have a sufficiently large number of ethylene ether units in order to ensure the solubility of the polycondensation products in water.

It goes without saying that for the production of water-soluble polyurethanes according to the present invention, it is also possible to use mixtures of the individual reactants, e.g. two or more different chloroformic acid esters and/or two or more different polyvalent amines.

By suitably adjusting the ratio between the polyvalent amines and water-soluble chloroformic acid esters, it is possible to ascertain the optimum combination for each intended application, a procedure which is known from the chemistry of ethylene oxide addition products. The basic polyurethanes which can be prepared with polyvalent amines are capable of a very wide range of chemical reactions since they contain reactive amino groups.

The products of the process are clear solutions having a broad viscosity range, depending on the molecular weight and the concentration of the polycondensation product. This product at a pH of from 5 to 9 can be stored for months at room temperature. The products can be further diluted with water in any proportion. It has been found, surprisingly, that films made from solutions of basic polyurethanes and dried at 100° C. are for the most part no longer soluble in water owing to cross-linking.

Another advantage of the process is that after polycondensation and adjustment to the desired pH, the water-soluble polyurethanes are obtained directly in the form of aqueous solutions containing organic solvents which may be miscible with water and can be used direct as such for the intended purpose.

The water-soluble condensation products prepared according to the invention are eminently suitable as thickeners for liquids and solutions. These polyurethanes exhibit unexpectedly high melting temperatures, chemical stability, physical stability, dyeability, weather resistance, resistance to heat distortion and high resistance to hydrolysis. These polyurethanes are valuable not only for the production of films, but for use in the preparation of coating compositions. In addition, these polymers are also useful as protective coatings, especially where resistance to scuffing and marking is important.

The present invention is further disclosed in the following examples which are illustrative but not limitative thereof. Unless otherwise indicated, the quantities given are expressed in parts by weight. The viscosities are given in centipoises as a measure for the degree of polycondensation.

EXAMPLE 1

A solution of about 225 parts of octaethylene glycol-bis-chloroformic acid ester in about 200 parts of glycol monomethyl ether acetate is added dropwise at 0 to 10° C., with stirring, to a solution of about 24 parts of ethylene diamine in about 450 parts of water cooled with ice water. As soon as the pH of the reaction mixture has dropped to about 8, a solution of about 50 parts of sodium carbonate in about 140 parts of water is added so that the pH of the solution is slightly alkaline to neutral during the polycondensation reaction. The solution is then stirred for about 1½ hours at a temperature of from about 30 to about 40° C. The clear, 20% polyurethane solution thus obtained has a viscosity of 20 cp./25° C.

EXAMPLE 2

A melt containing about 320 parts of bis-chloroformic acid ester of a polyethylene glycol having a molecular weight of about 1500 is added dropwise at a temperature of from about 5 to about 10° C., with agitation, to a cooled solution containing about 12 parts of ethylene diamine and about 21 parts of sodium carbonate in about 1000 parts of water. The reaction solution is then stirred for about 2 hours at a temperature of about 35° C. The clear, 23.5% polyurethane solution thus obtained has a viscosity of 200 cp./25° C.

EXAMPLE 3

A solution of about 380 parts of bis-chloroformic acid ester of a polyethylene glycol having a molecular weight of about 1500 in about 420 parts of acetone is added dropwise at a temperature of from about 3 to about 8° C., with agitation and cooling, to a solution containing about 23 parts of hexamethylenediamine in about 1300 parts of water. By the simultaneous addition of a solution containing about 35 parts of sodium carbonate in about 100 parts of water, the pH of the reaction mixture is maintained in a slightly alkaline region until the polycondensation reaction is terminated. The solution is then stirred for an additional 2 hours at a temperature of from about 30 to 40° C. A clear, 17 percent polyurethane solution is obtained. The solution has a viscosity of 40 cp./25° C.

EXAMPLE 4

A solution containing about 350 parts of octaethylene glycol-bis-chloroformic acid ester in about 1000 parts of acetone is added dropwise, with vigorous agitation, to a solution containing about 62 parts of diethylenetriamine in about 1500 parts of water over a period of about one hour. During this operation, the temperature of the reaction mixture is maintained between about 5 and 10° C. by cooling and the hydrogen ion concentration is maintained below about pH 6 by addition of a solution of about 63 parts of sodium carbonate in about 180 parts of water. When the viscosity of reaction solution increases sharply after the addition of the last portions of bis-chloroformic acid ester, the pH is adjusted to about 4 with concentrated hydrochloric acid. The clear, 11 percent solution of the basic polycondensation product thus obtained has a viscosity of 70 cp./25° C.

EXAMPLE 5

A solution containing about 21 parts of diethylene triamine in about 1000 parts of water is reacted as in Example 4 with a solution containing about 165 parts of bis-chloroformic acid ester of a polyethylene glycol having a molecular weight of about 600 in about 200 parts of glycol monomethyl ether acetate. As acid acceptor there is used a solution containing about 22 parts of sodium carbonate in about 100 parts of water. A clear, 11 percent solution of the basic polyurethane is obtained which has a viscosity of 100 cp./25° C.

EXAMPLE 6

A solution containing about 31 parts of diethylene triamine in about 4000 parts of water is reacted as in Example 4 with a solution of about 540 parts of bis-chloroformic acid ester of a polyethylene glycol having a molecular weight of about 1500 in about 1000 parts of acetone. A solution of about 32 parts of sodium carbonate in about 100 parts of water is used as the hydrochloric acid binding agent. A clear, 9.5 percent polyurethane solution having a viscosity of about 145 cp./25° C. is obtained.

EXAMPLE 7

A melt containing about 340 parts of bis-chloroformic acid ester of a polyethylene glycol having molecular weight of about 1500 is added dropwise, with vigorous agitation, at a temperature of from about 5 to about 10° C. to a solution containing about 29 parts of triethylene triamine in about 3000 parts of water over a period of about one hour. When all the melt has been added, a clear, approximately 10 percent polyurethane solution having a pH of 4 and a viscosity of 300 cp./25° C. is obtained.

EXAMPLE 8

A solution of 19 parts of tetraethylene pentamine in 1400 parts of water is reacted as in Example 7 with a solution of 170 parts of bis-chloroformic acid ester of a polyethylene glycol of molecular weight 1500 in 200 parts of glycol monomethyl ether acetate. A clear, 10% polyurethane solution having a viscosity of 60 cp./25° C. and a pH of 6 is obtained.

EXAMPLE 9

The solution in 20 parts of glycol monomethyl ether acetate of 20 parts of a trichloroformic acid ester prepared from the addition product of 1 mol of trimethylol propane and 20 mols of ethylene oxide is added dropwise at 5° C., with stirring and cooling, to a solution of 4.1 parts of diethylene triamine and 180 parts of water in the course of 45 minutes. A clear, approximately 10% solution is obtained which is adjusted to pH 4 with concentrated hydrochloric acid. The viscosity is then 27 cp./25° C.

EXAMPLE 10

The solution in 20 parts of glycol monomethyl ether acetate of 21 parts of a trichloroformic acid ester prepared from the addition product of 1 mol of trimethylol propane and 20 mols of ethylene oxide is added dropwise, with stirring and cooling, to a solution of 1.8 parts of ethylene diamine in 125 parts of water in the course of one hour. By adding, drop by drop, a solution of 2.4 parts of sodium carbonate in 15 parts of water, the pH is constantly kept above 6 during the polycondensation. The solution is then acidified to pH 4 with concentrated hydrochloric acid. The clear, 11% polyurethane solution obtained has a viscosity of 40 cp./25° C.

EXAMPLE 11

A solution containing about 32 parts of bis-chloroformic acid ester of a polyethylene glycol having a molecular weight of about 1500 in about 23 parts of glycol monomethyl ether acetate is added dropwise at 10° C., with stirring and cooling, to a solution containing about 3.8 parts of 2,4-diamino-benzene-(1)-sulphonic acid and about 1 part of sodium carbonate in about 92 parts of water over a period of about 30 minutes. The pH of the solution is maintained slightly on the alkaline side during the polycondensation reaction by adding dropwise a solution containing about 3 parts of sodium carbonate in about 10 parts of water. Approximately 4 parts of trichloroformic acid ester prepared from the addition product of about 134 parts of trimethylolpropane and about 1101.3 parts of ethylene oxide are then added dropwise. After agitating for about 5 hours approximately at about 20° C., the clear, 21 percent solution having a viscosity of about 30 cp./25° C. is obtained.

EXAMPLE 12

A solution containing about 26.5 parts of glycol monomethyl ether acetate of trichloroformic acid ester obtained from the reaction of about 134 parts of trimethylolpropane and about 1101.3 parts of ethylene oxide is added dropwise at a temperature between about 10 and 15° C., with agitation and cooling, to a solution containing about 3.8 parts of 2,4-diamino-benzene-(1)-sulphonic acid and about 1 part of sodium carbonate in about 129 parts of water over a period of about 40 minutes. After stirring for about 3 hours at a temperature between about 15 and 20° C., a clear, approximately 15 percent solution having a viscosity of 11 cp./25° C. is obtained.

EXAMPLE 13

840 parts of the bis-chloroformic acid ester of the polyether glycol prepared from 1 mol of polyethylene glycol (molecular weight 600) and 2 mols of propylene oxide are added slowly at 0–10° C. while intensely stirring to a solution of 103 parts of diethylene triamine in 7150 parts of water. The pH value of the reaction solution decreases to about 7. This value is maintained by adding a solution of 110 parts of sodium carbonate in 500 parts of water, until the addition of the bischloroformic acid ester is complete. A clear 10 percent polyurethane solution is obtained having a viscosity of 47 cp./25° C.

EXAMPLE 14

A solution of 146 parts of triethylene tetramine in 8590 parts of water is reacted as in Example 13 with 960 parts of the bis-chloroformic acid ester obtained from 1 mol of polyethylene glycol (molecular weight 600), 4 mols of propylene oxide and 2 mols of phosgene. A solution of 105 parts of sodium carbonate in 500 parts of water is used as an acid binding agent. A 10 percent polyurethane solution is obtained having a viscosity of 46 cp./25° C.

Although the invention has been described in considerable detail in the foregoing for the purpose of illustration, it is to be understood that variations may be made therein by those skilled in the art without departing from the spirit of the invention except as set forth in the claims.

What is claimed is:

1. A method for preparing aqueous-soluble polyurethanes which comprises reacting a water-soluble chloroformic acid ester of the formula

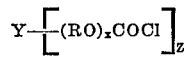

wherein Y is a member selected from the group consisting of oxygen, sulphur and at least a divalent radical remaining after removal of at least two mobile hydrogen atoms that will add to alkylene oxide, R is a lower alkylene group, $x$ is a number greater than 2 and $z$ is an integer of at least 2 with an aqueous solution of a polyfunctional amine having at least two amino groups selected from primary amino groups and secondary amino groups, the reaction occurring at a pH of at least 6.

2. The process of claim 1 wherein R is ethylene, mixtures of ethylene and propylene, or mixtures of ethylene and butylene.

3. The process of claim 1 wherein R is ethylene.

4. The method of claim 1 wherein the polyfunctional amine is represented by the general formula

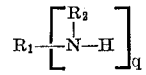

wherein $R_1$ is an organic radical, $R_2$ is a member selected from the group consisting of hydrogen, alkyl, hydroxyalkyl, cyanoalkyl and carbamidoalkyl radicals, and $q$ is an integer of at least 2.

5. The method of claim 1 wherein the polyfunctional amine is represented by the formula

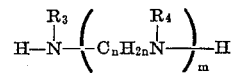

wherein $R_3$ and $R_4$ are selected from the group consisting of hydrogen, alkyl, hydroxyalkyl, cyanoalkyl and carbamidoalkyl radicals, $n$ is an integer of at least 2 and $m$ is an integer of at least 1.

6. The method of claim 1 wherein the polyfunctional amine is represented by the formula

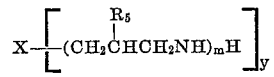

wherein X is a member selected from the group consisting of oxygen, sulfur, and at least a divalent radical selected from the group consisting of aliphatic, cycloaliphatic, araliphatic, aromatic, heterocyclic hydroxy and sulphhydryl compound, $R_5$ represents hydrogen and a lower alkyl group, $m$ is an integer of at least 1 and $y$ is an integer of at least 2.

7. The method of claim 1 wherein the chloroformic acid ester is reacted with the amine in the presence of a hydrochloric acid binding agent.

8. The method of claim 1 wherein at least a trifunctional chloroformic acid ester is reacted with the amine in a molar ratio of $1:(z-1)$ wherein $z$ is equal to the functionality of the chloroformic acid ester.

9. The method of claim 1 wherein the chloroformic acid ester is reacted with the amine at a temperature of from about 0 to about 50° C.

10. The method of claim 1 wherein the chloroformic acid ester is dissolved in an organic solvent miscible with water.

11. An aqueous-soluble polyurethane of claim 1.

References Cited

UNITED STATES PATENTS 3,254,056  5/1966  Lovell _____ 260—77.5

FOREIGN PATENTS 255,657  10/1962  Australia.
570,693  2/1959  Canada.
683,504  11/1952  Great Britain.

DONALD E. CZAJA, Primary Examiner

M. J. WELSH, Assistant Examiner

U.S. Cl. X.R.

260—29.2